April 13, 1954     R. MELVILLE     2,675,104
FLUID POWER TRANSMISSION
Filed Jan. 18, 1950     2 Sheets-Sheet 1

INVENTOR.
ROBERT MELVILLE
ATTORNEY

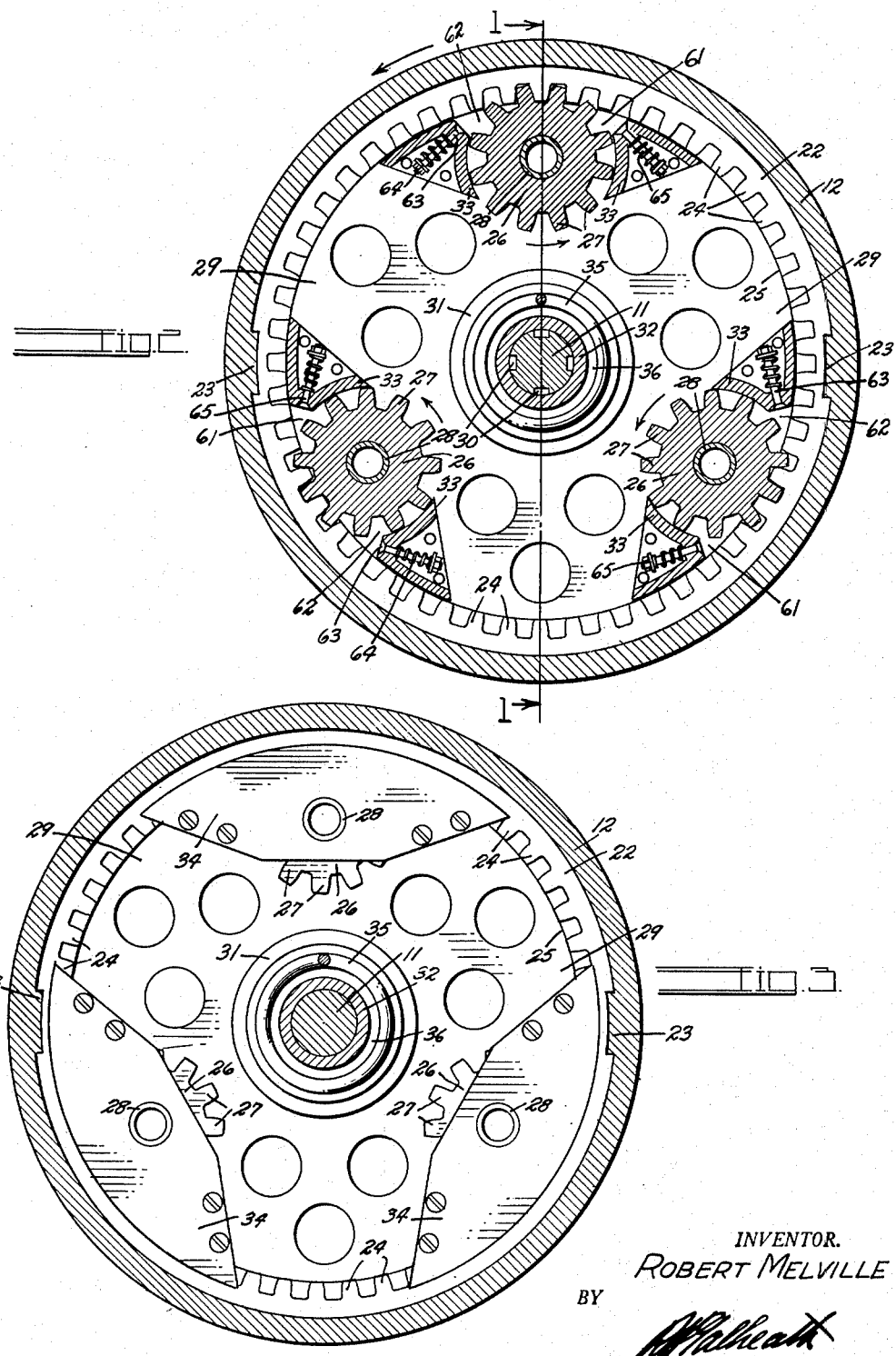

Patented Apr. 13, 1954

2,675,104

UNITED STATES PATENT OFFICE 2,675,104

FLUID POWER TRANSMISSION

Robert Melville, Challis, Idaho

Application January 18, 1950, Serial No. 139,255

7 Claims. (Cl. 192—61)

This invention relates to a fluid clutch mechanism for transmitting power from a drive shaft to a driven shaft, and has for its principal object the provision of a simple and highly efficient mechanism whereby the driven shaft may be gradually and smoothly brought up to the speed of the drive shaft through the medium of hydraulic resistance without the use of friction discs or friction surfaces of any kind.

In the usual hydraulic clutch mechanism the drive shaft actuates a pressure pump delivering fluid to a pressure motor, the clutch action depending upon the valving of the fluid between the pump and the motor. The present invention, however, has for its object the accomplishment of the above result without the use of valves by varying the action and reaction of the fluid pumping mechanism, per se.

A still further object is to provide in a hydraulic clutch a fluid pump construction of the gear type in which the area of contact between the teeth of the pumping gears may be varied by relative axial movement of the teeth to accurately and minutely control the capacity of, and the load on, the pump.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 2 is a cross-section therethrough, taken on the line 2—2, Fig. 1, with the hydraulic fluid omitted; and Fig. 3 is a similar cross-section, taken on the line 3—3, Fig. 1.

Figure 1:
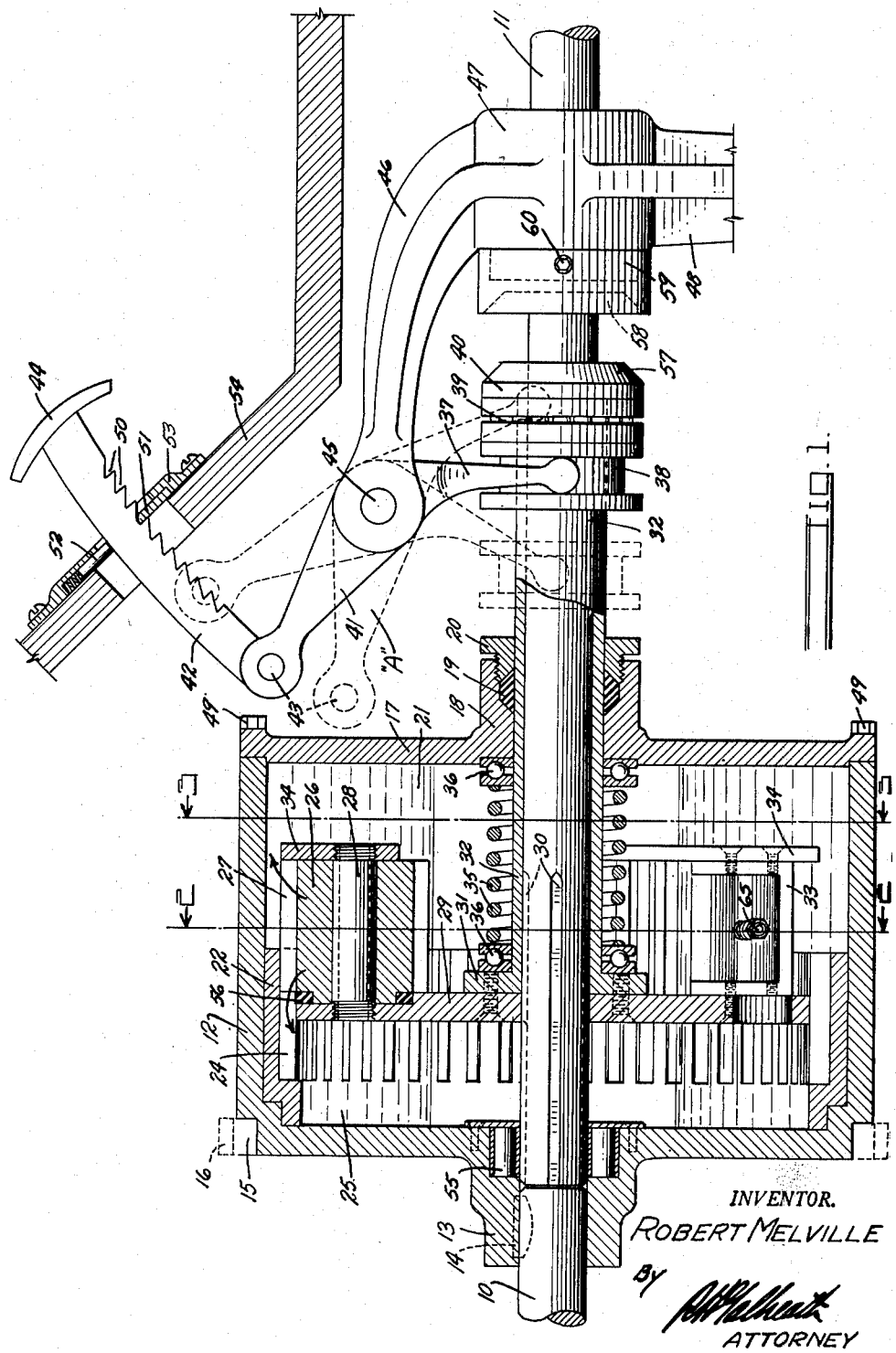
Fig. 1 is a longitudinal section through the improved fluid clutch mechanism, illustrating it in the partially engaged, operating position.

The sectional portion of Fig. 1 is taken on the line 1—1, Fig. 2.

In the drawing, the drive shaft, or engine crank shaft, is indicated at 10, and the driven shaft, or vehicle propeller shaft, is indicated at 11.

A fly wheel drum 12 is fixedly mounted on the extremity of the drive shaft 10 through the medium of a suitable hub 13 and key 14, or other mounting means. The extremity of the driven shaft 11 is rotatably mounted in the hub 13 in axial alignment with the drive shaft 10 by means of suitable bearings 55. The fly wheel drum 12 may be provided with a peripheral notch 15 for receiving the usual starter ring gear, as indicated in broken line at 16. The rear face of the drum 12 is closed by means of a circular cover plate 17 secured in place by means of suitable cap screws 49. The cover plate 17 is provided with a hub 18, containing suitable packing 19 and a packing gland 20 for sealing hydraulic fluid, indicated at 21, within the drum 12.

An internal ring gear, which will be herein designated as the orbit gear 22, is fitted within and secured to the drum 12 in any desired manner, such as by means of key splines 23, so that it will rotate with the drum. The width of the orbit gear is substantially one-half the width of the drum 12, as shown in Fig. 1. The teeth of the orbit gear, indicated at 24, do not extend the full width of the latter gear, so that a cylindrical landing surface 25 is provided adjacent the forward extremity of the drum 12.

A plurality of planet gears 26, three being illustrated, are employed having teeth 27 which may be brought into mesh with the teeth 24 of the orbit gear 22. Each planet gear carries an annular ring 56 of rubber or other compressible material about its forward extremity for purposes which will be later described. The planet gears 26 are journalled on tubular planet shafts 28 threaded or otherwise fixedly mounted in a planet disc 29. The disc 29 is splined on the extremity of the driven shaft 11 in suitable splineways 30 so that it may move longitudinally of the shaft 11 but must rotate therewith.

A pump wall member 33 is positioned at each side of each planet gear 26 so as to extend throughout the entire length of the latter. The surfaces of the pump wall members are contoured to maintain slidable engagement with both the teeth 24 of the orbit gear 22 and the teeth 27 of the planet gears 26.

The pump wall members 33 support side plates 34 at the rear extremities of the planet gears 26. The side plates are threaded on, or otherwise secured to, the tubular planet shafts 28 to assist in supporting the latter. The plates 34 also form side walls for the pump constructions created by the interaction of the teeth 24 and 27.

The disc 29 is fixedly secured to a flange 31 formed on the extremity of a shifting sleeve 32 which surrounds the shaft 11 and is longitudinally movable thereon. The disc is constantly urged forwardly so as to bring the teeth 27 and 24 into mesh by means of a compression spring 35 which is compressed between suitable thrust bearings 36 which bear against the flange 31 and the cover plate 17, respectively.

The planet disc 29 may be moved axially of the shaft 11 against the action of the spring 35 in any desired manner, depending upon the particular installation to which the improved clutch is applied. As illustrated, the disc is shifted by means of a shifting yoke 37 which rides in a grooved shifting collar 38. The collar 38 acts against an anti-friction thrust bearing 39, which in turn acts against a terminal flange 40 secured on or formed integrally with the rear extremity of the shifting sleeve 32.

The yoke 37 forms an extension of a yoke lever 41 which is connected to a pedal post 42 by means of a suitable hinge pin 43. The pedal post terminates in an operator's foot pedal 44. The lever 41 and its yoke 37 are pivotally mounted on a pivot pin 45 supported from any suitable fixed support. As illustrated, the pin 45 is supported in a stationary bracket 46 extending from a fixed shaft bearing 47 carried from a fixed support 48 and serving as a bearing for the driven shaft 11.

The pedal 44 is held in any desired depressed position against the action of the spring 35 by means of ratchet teeth 50 formed in the lower edge of the pedal post 42. The teeth 50 are urged into engagement with a stationary ratchet dog 51 by means of a spring-actuated plunger 52, or in any other desired manner. The dog 51 and the plunger 52 are carried in a mounting plate 53 which is secured to the floor of the automotive vehicle, as indicated at 54.

The terminal flange 40 is provided with a cone clutch surface 57 on its rear side which may be brought into engagement with a conical clutching depression 58 formed in a clutch collar 59 which is fixedly secured to the shaft bearing 47 in any desired manner, such as by means of a suitable set screw 60.

Let us assume that the drum 12 is partially filled with the fluid 21; that the shaft 10 and the drum 12 are rotating, as indicated by the arrows in Fig. 1; that the pedal 44 is fully depressed, as indicated by the broken line position "A", Fig. 1; that the teeth 27 are entirely out of engagement with the teeth 24; and that the cone clutch 57 is engaged in its depression 58. The centrifugal action of the rotation, of course, maintains the hydraulic fluid in an annular ring about the inside of the drum 12, as indicated in Fig. 1. There is no transmission of power at this time. The planet gear disc 29 and the planet gears 26 are stationary.

Now let us assume that the teeth 50 of the pedal post 42 are released to allow the pedal 44 to rise. The first result is to release the clutch cone 57 from its clutching depression. This allows the rotating ring of fluid in the drum to act against the planet disc 29 and its associated structure so as to initially transmit power to the driven shaft 11. Further release of the pedal 44 brings the resilient starting collars 56 carried by the planet gears 26 into contact with the extremities of the orbit gear teeth 24. This initiates the rotation of the planet gears and brings the peripheral speed thereof into synchronism with the teeth 24 so that the teeth 27 may slide between the teeth 24 without interference. This immediately creates a gear pump effect at each planet gear, since fluid will be confined in the spaces between the teeth 27 and 24 by the pump wall members 33. The carried fluid will be extruded from the spaces between the teeth by the intermeshing of the teeth so as to create a pressure in the chambers formed by the associated planet gears, orbit gear, and wall members 33, the latter chambers being indicated at 61 in Fig. 2. This pressure, of course, creates resistance to the rotation of the planet gears, and this resistance is transmitted as reaction to the planet gear disc 29, thus applying torque to the driven shaft 11. The pressure and the resistance at this time is slight, since the fluid can escape over the side plates 34 and through the spaces between the gear teeth 24, as indicated by the arrows in Fig. 1.

Now let us assume that the pedal 44 is still further released. This accomplishes two purposes. First, it brings a greater surface area of the teeth 27 and 24 into contact so as to increase the fluid displacement and the pumping effect of the gears. Second, it decreases the fluid escapement space over the teeth 27 and 24, since the side plates 34 are approaching the extremity of the orbit gear 22, and the planet disc 29 is approaching the extremities of the orbit gear teeth 24. Therefore, still additional resistance will be presented to the individual rotation of the planet gears and additional torque will be applied to the driven shaft 11. The pumping effect continues to increase and the discharge orifices continue to decrease until the planet gear disc 29 passes onto the landing surface 25 of the orbit gear 22, and the side plates 34 completely close the spaces between the teeth 24. At this time the pumping effect has reached the maximum capacity of the gears, and the discharge orifice spaces have been completely closed, resulting in locking the planet gears 26 to the orbit gear 22 so as to cause the drive shaft 10 and the driven shaft 11 to rotate in unison.

To disengage the clutch, it is only necessary to completely depress the pedal 44 until the conical clutching surface 57 again engages the stationary cone clutch collar 59.

It will be noted that the pump wall members 33 are positioned on both sides of each planet gear. This forms a second pressure chamber 62 on the opposite side of each planet gear. When the gears are rotating, as indicated by the arrows in Fig. 1, a partial vacuum is being created in the pressure chambers 62. This vacuum is broken, however, by fluid being admitted through suitable check valve 63, actuated by check valve springs 64, which allow fluid to flow from the drum into the chambers 62.

Should the drum 12 be rotated in the opposite direction from the arrows, the opposite effect will take place, that is, pressure will be created in the chambers 62 and a partial vacuum will be created in the chambers 61. The latter chambers are also provided with vacuum breaking check valves 65 similar to the valves 63 and for the same purpose.

While the invention has been described with the planet gear disc and the planet gears mounted on the driven shaft, and the orbit gear mounted on the drive shaft, it can be readily seen that the mountings could be reversed and the same effect obtained. For instance, the planet gears could be mounted on and within the drum 12 and the orbit gear could be mounted on the periphery of the disc, without altering the final result, or the shaft 11 could be drive shaft and the shaft 10 the driven shaft, if preferred.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A fluid clutch construction for transmitting power from a first shaft to a second shaft in axial alignment with each other, comprising: a fluid drum fixedly mounted on the first shaft; a planet gear disc slidably mounted on the second shaft within said drum; an internal orbit gear secured in said drum; planet gears carried by said planet gear disc and adapted to mesh with said orbit gear; means for moving said planet gear disc axially of said second shaft so as to bring said planet gears axially into mesh with said orbit gear; side plates on said planet gears extending outwardly beyond the periphery thereof; a cylindrical surface on said orbit gear in circumferential alignment with the surfaces of the teeth of said orbit gear, said planet disc being arranged to move into slidable engagement with the cylindrical surface of the orbit gear to prevent fluid from escaping from between said teeth at the extremities thereof; pump walls carried by said planet disc at the side of each planet gear and in wiping engagement with the teeth of said planet gears and in axially adjustable slidable engagement with the teeth of said orbit gear so as to create a pressure chamber adjacent the point of intermeshing of said gears; and valve means in said pump walls allowing fluid to enter said pressure chamber.

2. A fluid clutch construction for transmitting power from a first shaft to a second shaft in axial alignment with each other, comprising: a fluid drum fixedly mounted on the first shaft; a planet gear disc slidably mounted on the second shaft within said drum; an internal orbit gear secured in said drum; planet gears carried by said planet gear disc and adapted to mesh with said orbit gear; side plates on said planet gears extending outwardly beyond the periphery thereof; a cylindrical surface on said orbit gear in circumferential alignment with the surfaces of the teeth of said orbit gear, said planet disc being arranged to move into slidable engagement with the cylindrical surface of the orbit gear to prevent fluid from escaping from between said teeth at the extremities thereof; pump walls carried by said planet disc at the side of each planet gear and in wiping engagement with the teeth of said planet gears and in axially adjustable slidable engagement with the teeth of said orbit gear so as to create a pressure chamber adjacent the point of intermeshing of said gears; a shifting sleeve surrounding the second shaft and being fixedly secured to said planet disc; means on the exterior of said drum for shifting said sleeve axially to move said planet gears longitudinally toward and away from said orbit gear; and valve means in said pump walls allowing fluid to enter said pressure chamber when said planet gears are moved away from said orbit gear.

3. In a fluid power transmission, a drive shaft; a driven shaft in axial alignment with said drive shaft; a fluid drum fixedly mounted on the drive shaft; an internal orbit gear secured in said drum; a planet gear disc fixed on said driven shaft within said drum; planet gears carried by said disc in mesh with said orbit gear; pump walls carried by said disc in wiping contact with said orbit and planet gears; means mounting said planet disc on said driven shaft so that said disc may be moved axially along said driven shaft to vary the meshing relationship between said planet gears and said orbit gear, said pump walls cooperating with said orbit and planet gears to form a pressure chamber adjacent the point of intermeshing of said gears; and a check valve in each pump wall opening toward said pressure chamber to allow fluid to enter the latter under the influence of a vacuum therein.

4. In a fluid power transmission as described in claim 3, means for holding the planet gear disc at any desired position of adjustment; and valve means in said pump walls at each side of the meshing point of said gears for rapid inlet of fluid to said planet gears to allow rapid separation of said planet gears from said orbit gear.

5. A fluid power transmission as described in claim 3 in which the external diameter of the planet gear disc corresponds to the internal diameter of said orbit gear so as to completely close the latter.

6. A fluid power transmission comprising: a drive shaft; a fluid drum fixedly and concentrically mounted on the extremity of said drive shaft; a driven shaft extending axially through said drum in axial alignment with said drive shaft; an orbit gear fixedly fitted into said drum concentric of said driven shaft and adjacent the drive shaft extremity of said drum, said orbit gear having a width substantially equal to one-half the width of said drum; internal teeth grooves extending into said orbit gear from the inner peripheral edge thereof; a cylindrical landing surface in said orbit gear positioned between said teeth grooves and the drive shaft extremity of said drum; a planet gear disc splined on said driven shaft within said orbit gear, the external diameter of said disc equaling the inner diameter of said orbit gear and said landing surface so as to seal the tops of the teeth formed by said teeth grooves; planet gears rotatably mounted on the inner face of and in contact with said disc at their one extremities, the teeth of said planet gears projecting beyond the periphery of said disc into said teeth grooves; a side plate against the other face of each planet gear; a wall member positioned at each side of each planet gear and supporting said side plates from said planet gear disc, each of said wall members being in sliding engagement with both the adjacent planet gears and the tops of the teeth formed by the teeth grooves in said orbit gear, the outer edges of said side plates being arcuately curved on an arc and a diameter corresponding to the position of the bottoms of said teeth grooves; spring means urging said planet gear disc toward said landing surface; manual means connected with said planet gear disc for resisting the action of said spring, said wall members cooperating with said orbit and planet gears to form a pressure chamber adjacent the point of intermeshing of said gears; and a check valve in each wall member opening toward said pressure chamber to allow fluid to enter the latter under the influence of a vacuum therein.

7. A fluid clutch construction for transmitting power from a first shaft to a second shaft in axial alignment with each other, comprising: a fluid drum fixedly mounted on the first shaft; a planet gear disc slidably mounted on the second shaft within said drum; an internal orbit gear secured in said drum; planet gears carried by said planet gear disc and adapted to mesh with said orbit gear; side plates on said planet gears extending outwardly beyond the periphery thereof; a cylindrical surface on said orbit gear in circumferential alignment with the surfaces of the teeth of said orbit gear, said planet disc being arranged to move into slidable engagement with the cylindrical surface of the orbit gear to prevent fluid from escaping from between said teeth at the extremities thereof; pump walls carried by said planet disc at the side of each planet gear and in wiping engagement with the teeth of said planet gears and in adjustable sliding engagement with the teeth of said orbit gear so as to create a pressure chamber adjacent the point of intermeshing of said gears; a shifting sleeve surrounding the second shaft and being fixedly secured to said planet disc; means on the exterior of said drum for shifting said sleeve axially to move said planet gears longitudinally toward and away from said orbit gear, the rotation of said drum acting to create an annular zone of fluid in the periphery of said drum when the latter is rotated, said gears and pump walls being positioned to operate in said zone of fluid, said pump walls cooperating with said orbit and planet gears to form a pressure chamber adjacent the point of intermeshing of said gears; and a check valve in each pump wall opening toward said pressure chamber to allow fluid to enter the latter under the influence of a vacuum therein.

References Cited in the file of this patent

UNITED STATES PATENTS

| Number | Name | Date |
|---|---|---|
| 1,677,327 | Bradley | July 17, 1928 |
| 1,742,215 | Pigott | Jan. 7, 1930 |
| 2,070,614 | Melville | Feb. 16, 1937 |
| 2,149,326 | Wilkin | Mar. 7, 1939 |
| 2,396,149 | Bock | Mar. 5, 1946 |